United States Patent
Wakamatsu et al.

(10) Patent No.: US 6,784,079 B2
(45) Date of Patent: Aug. 31, 2004

(54) METHOD OF MANUFACTURING SILICON

(75) Inventors: Satoru Wakamatsu, Tokuyama (JP); Hiroyuki Oda, Tokuyama (JP)

(73) Assignee: Tokuyama Corporation, Yamaguchi-ken (JP)

( * ) Notice: Subject to any disclaimer, the term of this patent is extended or adjusted under 35 U.S.C. 154(b) by 28 days.

(21) Appl. No.: 10/343,945

(22) PCT Filed: Jun. 6, 2002

(86) PCT No.: PCT/JP02/05612
§ 371 (c)(1), (2), (4) Date: Feb. 5, 2003

(87) PCT Pub. No.: WO02/100777
PCT Pub. Date: Dec. 19, 2002

(65) Prior Publication Data
US 2003/0119284 A1 Jun. 26, 2003

(30) Foreign Application Priority Data
Jun. 6, 2001 (JP) ........................... 2001-170430

(51) Int. Cl.[7] .......................... H01L 21/20; H01L 21/36
(52) U.S. Cl. ........................... 438/507; 438/493
(58) Field of Search ............................. 438/507, 493, 438/492, 478, 509

(56) References Cited

U.S. PATENT DOCUMENTS

| 4,019,887 A | * | 4/1977 | Kirkbride et al. ............ 65/60.8 |
| 4,123,989 A | * | 11/1978 | Jewett ........................ 118/724 |
| 4,464,222 A | | 8/1984 | Gutsche |

FOREIGN PATENT DOCUMENTS

| JP | 51-37819 A | 3/1976 |
| JP | 53-108030 A | 9/1978 |
| JP | 59-121109 A | 7/1984 |
| JP | 63-139013 A | 6/1988 |
| JP | 1-208312 A | 8/1989 |
| JP | 2002-29726 A | 1/2002 |

* cited by examiner

Primary Examiner—Craig A. Thompson
(74) Attorney, Agent, or Firm—Birch, Stewart, Kolasch & Birch, LLP

(57) ABSTRACT

A production method of silicon which comprises the steps of bringing a silane into contact with a surface of a substrate so as to cause silicon to be deposited while the surface of the substrate is heated to and kept at a temperature lower than the melting point of the silicon, and raising the temperature of the surface of the substrate so as to cause a portion or all of the deposited silicon to melt and drop from the surface of the substrate and be recovered.

2 Claims, 2 Drawing Sheets

METHOD OF MANUFACTURING SILICON

This application is the national phase under 35 U.S.C. §371 of PCT International Application No. PCT/JP02/05612 which has an International filing date of Jun. 6, 2002, which designed the United States of America.

TECHNICAL FIELD

The present invention relates to a method for producing silicon applicable to a semiconductor or photovoltaic power generation from a silane. More specifically, the present invention relates to a production method of high purity silicon which comprises removing and recovering silicon deposited on a substrate in a silicon deposition reactor from the substrate without cooling the silicon and with small effort so as to improve a rate of operation of the reactor.

BACKGROUND ART

A variety of methods for producing silicon to be used as a raw material for a semiconductor or photovoltaic system have heretofore been known, and some of them are already actually used in industry.

One of the actually used methods is a method called as a Siemens method. This method is a method in which a thin silicon filament which serves as a substrate for deposition is disposed in a bell jar and then heated by energization and trichlorosilane ($SiHCl_3$) or monosilane ($SiH_4$) is then brought into contact with the substrate so as to cause silicon to be deposited in solid form. The method is the most generally practiced method at present.

In the Siemens method, after termination of the energization, the bell jar is opened after the silicon filament which is a deposit is allowed to fully cool down, and after the fragile deposit is carefully recovered, another thin silicon filament must be disposed with high accuracy. Therefore, considerable effort is required each time the deposit is recovered, and a time interval between depositions is long, so that a rate of operation of the deposition reactor is low.

Meanwhile, methods for continuously recovering silicon deposited in a deposition reactor are proposed in JP-A 59-121109, JP-A 51-37819 and JP-A 2002-29726. These are methods in which while silicon is being deposited in a molten state on a surface of a substrate heated at least to the melting point of silicon by bringing a silane into contact with the surface of the substrate, the molten deposit is recovered from the surface of the substrate as it is and then extracted from the reactor as molten silicon or cooled/solidified silicon.

Since these methods carry out deposition of silicon at high temperatures, these methods exhibit very good deposition efficiency and can produce silicon at a low cost. However, molten silicon obtained by these methods has such strong reactivity that it is even called "super solvent" (universal solvent) and has a problem that it is liable to be contaminated by the surface of the substrate with which the molten silicon makes contact. Accordingly, it has been difficult in some cases to obtain high purity silicon which can be used particularly in semiconductors.

AN OBJECT OF THE INVENTION

Therefore, an object of the present invention is to provide a silicon production method which can deposit and recover silicon usable in a semiconductor or photovoltaic power generation from a silane continuously, can improve a rate of operation of a reactor thereby, and can produce high purity silicon continuously as compared with a conventional silicon production method which causes silicon to be deposited in a molten state.

Other objects and advantages of the present invention will be apparent from the following description.

DISCLOSURE OF THE INVENTION

According to the present invention, the above object and advantage of the present invention can be achieved by repeating, in the same apparatus, a step of depositing silicon as a solid by heating a surface of a substrate to a temperature lower than the melting point of the silicon and a step of causing a portion or all of the deposited silicon to melt and drop by heating the surface of the substrate to a temperature equal to or higher than the melting point of the silicon when the deposition of the silicon in solid form has proceeded to a certain point.

That is, according to the present invention, there is provided a method for producing silicon which comprises a step (hereinafter referred to as "step 1") of depositing silicon on said surface by bringing a silane into contact with the surface of a substrate while the surface of the substrate is heated to and kept at a temperature lower than the melting point of the silicon and a step (hereinafter referred to as "step 2") of melting a portion or all of the deposited silicon and to drop and recover the melted silicon from the surface of the substrate by raising the temperature of the surface of the substrate.

In the above method of the present invention, by depositing silicon in solid form, the silicon is hardly contaminated by the substrate at the time of deposition of the silicon. Further, for recovery of the silicon, by causing at least silicon deposited on the surface of the substrate to melt and drop from the substrate, time during which the molten silicon is in contact with the surface of the substrate can be shortened as compared with a conventional method in which silicon remains in a molten state after deposited. As a result, contamination caused by contact between the substrate and the molten silicon can be reduced effectively. Further, according to the method of the present invention, deposition and recovery of silicon can be carried out continuously. In addition, since speed at which silicon is deposited on the surface of the substrate reaches a maximum in a temperature range slightly lower than the melting point of the silicon, a temperature range in which the deposition speed is high can be selected as compared with the conventional melt-deposition method, whereby productivity can be improved.

BEST MODE FOR CARRYING OUT THE INVENTION

Figure 1:
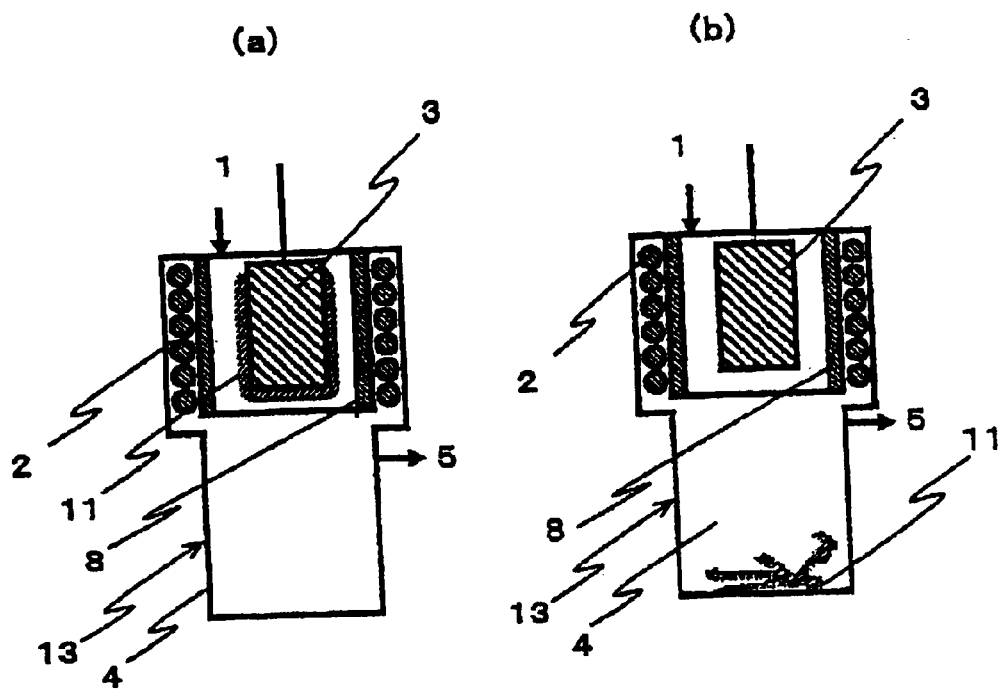
FIG. 1 is a conceptual diagram showing the steps in the method of the present invention using a reactor of a representative embodiment.

The step (1) of the present invention is a step of depositing silicon by bringing a silane into contact with the surface of a substrate while the surface of the substrate is heated to and kept at a temperature lower than the melting point of the silicon.

An example of the silane used in the above step (1) is a compound represented by the following formula:

(wherein X is a halogen atom, alkoxyl group or alkyl group, a is a positive integer, and b and c are each independently 0 or a positive integer, provided that a, b and c satisfy a relationship of 2a+2=b+c).

The halogen atom represented by X is preferably chlorine. The alkoxyl group is preferably an alkoxyl group having 1 or 2 carbon atoms, and the alkyl group is preferably an alkyl group having 1 or 2 carbon atoms.

Specific examples of the silane include silane hydrides such as monosilane ($SiH_4$), disilane ($Si_2H_6$) and trisilane ($Si_3H_8$); halosilanes such as monochlorosilane ($SiH_3Cl$), dichlorosilane ($SiH_2Cl_2$), trichlorosilane ($SiHCl_3$) and silicon tetrachloride ($SiCl_4$); alkoxysilanes such as triethoxysilane ($SiH(C_2H_5O)_3$) and tetraethoxysilane ($Si(C_2H_5O)_4$); alkylsilanes such as methylsilane ($SiH_3CH_3$) and dimethylsilane ($SiH_2(CH_3)_2$); and alkylhalosilanes such as methyldichlorosilane ($SiHCl_2CH_3$), methyltrichlorosilane ($SiCl_3CH_3$), dimethylchlorosilane ($SiHCl(CH_3)_2$) and dimethyldichlorosilane ($SiCl_2(CH_3)_2$).

When silicon obtained by the method of the present invention is used as a raw material for a semiconductor or photovoltaic power generation, the silane hydride, halosilane and alkoxysilane among the above silanes are preferably used as main components. Of these, monosilane, disilane, dichlorosilane, trichlorosilane, silicon tetrachloride, triethoxysilane and tetraethoxysilane all of which can be purified to high purity are more preferable, and monosilane, dichlorosilane, trichlorosilane and silicon tetrachloride all of which can be industrially mass-produced and are widely used are particularly preferably used. These silanes can be used alone or in combination of two or more.

It is advantageous that these silanes are fed into a reaction system in gaseous form either solely or together with hydrogen as required.

In the present invention, it is easy and preferable to heat the substrate by a method using an electric current or electromagnetic wave.

For example, when the substrate is heated by means of an electromagnetic wave, an electromagnetic wave having a frequency of several hundreds of Hz to several tens of $GH_2$ can be used. In this case, appropriate frequency is selected as required according to the material and shape of the substrate to be heated.

In the present invention, the substrate for depositing silicon on its surface must be composed of a material which can be heated directly or indirectly to a temperature higher than or equal to the melting point of the silicon. Illustrative examples of the material include a carbon material typified by graphite and a ceramic material such as silicon carbide. The carbon material is the most preferable.

When the above carbon material is used as the substrate, a portion or all of the material is converted into silicon carbide by making contact with molten silicon. In the present invention, the material in that state can be used as the substrate.

Further, the surface portion of the above substrate which makes direct contact with silicon to be deposited may be composed of a material which is relatively resistant to molten silicon. To be more specific, when the substrate is heated by means of an electromagnetic wave, the surface portion is preferably coated with a material such as silicon nitride, silicon carbide or pyrocarbon. A method for carrying out the coating is not limited. It is convenient to carry out the coating by means of a separately molded insert.

One of important objects of the present invention is to prevent deterioration of the substrate by molten silicon and contamination of silicon products caused by the deterioration of the substrate, with respect to the conventional method for depositing silicon at the melting temperature of the silicon. Therefore, in the step (1) where silicon is deposited by contact between a raw material gas and the substrate, it is important to keep the temperature of the surface of the substrate at a temperature lower than the melting point of the silicon.

More specifically, in the conventional method for depositing silicon in a molten state, since deposited, molten silicon is always in contact with the substrate, the deposited silicon is constantly subjected to a chance of contamination. Meanwhile, in the step (1) in the present invention, since silicon is deposited in solid form, most of deposits are successively deposited on the surface of high purity solid silicon regardless of the material of the substrate, and the deposit has essentially high purity as in the case of the Siemens method. Further, by rendering the temperature of the deposition as close to the melting point of silicon as possible, the deposition can be further accelerated.

Further, in the step (1) of the present invention, since the size of the deposition substrate is not limited by the surface tension and tare weight of molten silicon, it can be rendered sufficiently large, whereby an industrial-scale production amount can be secured.

The temperature of the surface of the substrate in the step (1) is preferably at least 600° C. at which silicon is deposited. However, in order to improve efficiency of deposition of silicon, it is preferably at least 1,100° C., more preferably higher than 1,250° C., most preferably at least 1,350° C.

These preferable deposition temperatures are conditions which are not used easily in the conventional Siemens method and are temperatures which can be used only in the method of the present invention. That is, in the case of the Siemens method, when the above deposition temperature is 1,100° C., the surface of an accumulated deposit becomes quite uneven, so that normal deposition becomes difficult to continue, while when the above deposition temperature is 1,250° C. or higher, there arises a very high possibility in Siemens method that a deposit may be fused.

Further, an upper limit of the deposition temperature of silicon in the step (1) is lower than the melting point of the silicon. Although there are a variety of different opinions on the melting point of silicon which is the upper limit temperature, it should be understood that the melting point is within a range of 1,410 to 1,430° C.

In the step (2) of the present invention, the temperature of the surface of the substrate is increased to a temperature equal to or higher than the melting point of silicon, and a portion or all of deposited silicon is caused to melt and drop from the surface of the substrate so as to be recovered.

Further, in the step (2), it is sufficient to increase the temperature of the surface of the substrate to at least a temperature at which the deposited silicon melts, i.e., the melting point of the silicon. However, as the surface temperature becomes higher, more energy than necessary is consumed, and in some cases, deterioration of the material of the substrate is accelerated. Accordingly, the surface temperature is more preferably not higher than 1,600° C.

In the step (2) of the present invention, a portion or all of silicon deposited on the surface of the substrate is caused to melt and drop. Thus, when time during which the temperature of the substrate is raised to and kept at a temperature equal to or higher than the melting temperature of silicon is defined as recovery time, the recovery time is desirably as short as possible so as to prevent contamination of recovered silicon and deterioration of the material of the substrate and to improve a rate of operation of the deposition reactor. That is, the recovery time is preferably less than 30%, more preferably less than 10%, most preferably less than 5% of total operation time.

In the above step (2), to cause a portion or all of silicon deposited on the surface of the substrate to melt and drop, the surface of the substrate having the silicon thereon is heated to a temperature equal to or higher than the melting point of the silicon as described above. As means for increasing the temperature of the surface of the substrate, a method of increasing the output of the foregoing electric current or electromagnetic wave for heating is generally used. Further, a method of reducing the amount of gas flowing in the reactor may also be used alone or in combination with the above method.

In this case, in order to cause the silicon deposited on the surface of the substrate to drop stably, as for heating of the surface of the substrate in reactor, it is preferably to enable it to control independently the temperature of each portion of the substrate surface. More specifically, in an embodiment in which the substrate is heated by means of an electromagnetic wave, it is recommended to use a reactor in which induction heating coil for applying the electromagnetic wave is divided into a plurality of layers and the output of each of the divided layers can be controlled independently.

In the present invention, a method of increasing the temperature of the surface of the substrate at least to the melting point of silicon may be, for example, a method of increasing the output of induction heating coil, in a case where the substrate is heated by means of an electromagnetic wave.

Although the embodiment in which the substrate is heated by use of an electromagnetic wave has been mainly described above, it is also possible to heat the substrate by energizing the substrate.

Meanwhile, silicon is a semiconductor and exhibits considerably high conductivity at high temperatures where a deposition reaction takes place. Therefore, when a conductive substrate is used and heated by passing a current through the substrate so as to deposit silicon on the surface of the substrate, the current inevitably passes through the deposited silicon. As the current is increased so as to melt the deposited silicon as described above, a portion of the surface of the silicon which makes contact with the substrate starts to melt, and a current density converges to the portion. As a result, the contact surface melts preferentially from the portion as a starting point, and the silicon deposited on the surface of the substrate can be caused to drop.

Of the foregoing heating methods, the method of heating the substrate by means of an electromagnetic wave is more preferable as the heating method of the present invention because melting of silicon by heating of the substrate is not influenced by the thickness or crystal state of the deposited layer.

In the method of the present invention, by adopting the step (2) of melting and recovering a portion or all of a deposit on the surface of the substrate, such operations in a batch process required in the conventional Siemens method as replacement of gas inside a bell jar, opening of the bell jar and setting of a new silicon filament can be all left out, thereby improving a rate of operation of a reactor significantly.

Hereinafter, the present invention will be described in more detail with reference to the attached drawings. However, the present invention shall not be limited to embodiments illustrated in these attached drawings.

Figure 2:
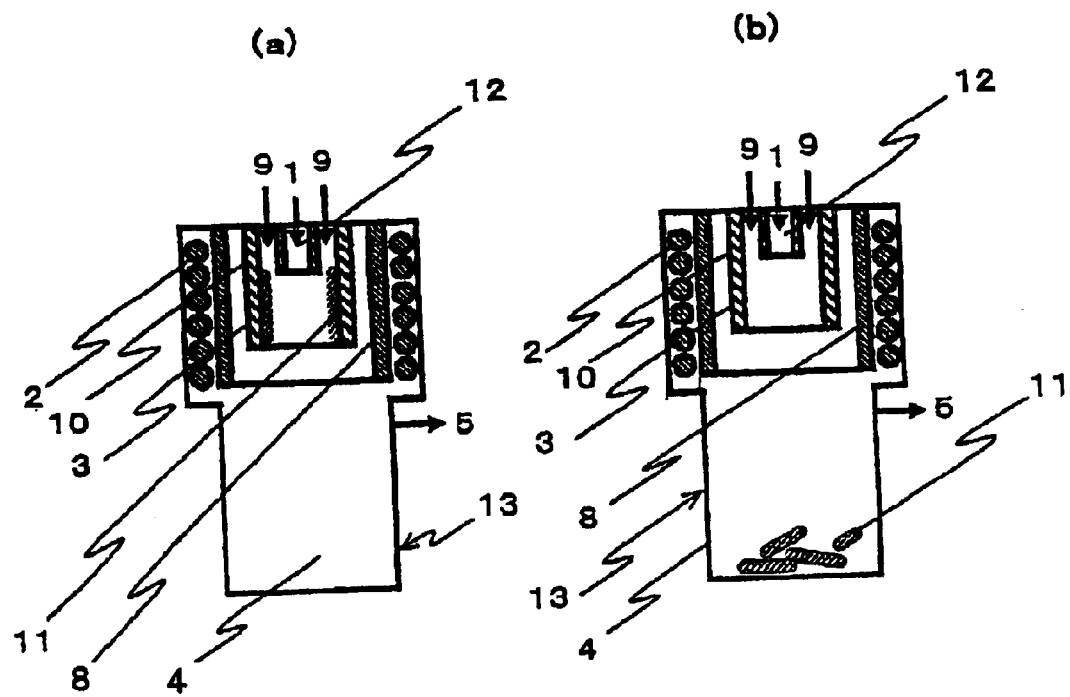
FIG. 2 is a conceptual diagram showing the steps in the method of the present invention using a reactor of another representative embodiment.

FIGS. 1 and 2 are conceptual diagrams illustrating the steps in the method of the present invention using reactors in which a substrate is heated by means of an electromagnetic wave (high-frequency wave).

The reactors shown in FIGS. 1 and 2 comprise a casing 13 having a feed port 1 for feeding a silane as a deposition raw material, a heater 2 for generating an electromagnetic wave, a substrate 3 which is heated by means of an electromagnetic wave, a recovery part 4 for recovering a dropped deposit, and an exhaust gas outlet 5. In this case, between the heater 2 for generating an electromagnetic wave and the substrate 3 to be heated, as shown in FIGS. 1 and 2, a partition wall 8 which is made of a material which does not block an electromagnetic wave is preferably placed so as to isolate the heater 2 from an atmosphere in which the substrate 3 exists.

As the material which does not block an electromagnetic wave, a material having heat resistance and insulation properties such as quartz, SIALON or aluminium nitride is suitable.

Further, FIG. 1 shows an embodiment in which the substrate 3 is in the form of a stick and silicon is deposited on the external surface of the substrate, and FIG. 2 shows an embodiment in which the substrate has a cylindrical shape which opens downwardly and silicon is deposited on the internal wall of the substrate. Of these embodiments, particularly, the embodiment (FIG. 2) in which the substrate has a cylindrical shape is suitable since heating efficiency is good.

Further, in FIGS. 1 and 2, (a) shows a state of silicon 11 being deposited on the surface of the substrate by the step (1), and (b) shows a state of the silicon 11 caused to melt and dropped by the step (2).

In the above step (1), a seal gas is preferably fed so as to prevent the raw material gas from making contact with the surface of the substrate other than a surface area where the silicon is deposited.

FIG. 2 shows an embodiment in which a seal gas is fed into space between the cylindrical substrate and the raw material gas feed port 1 from a seal gas feed port 9. As the seal gas, gas such as hydrogen or argon is suitably used.

Further, when a reaction reagent which produces the raw material gas by reacting with silicon is fed continuously or intermittently together with or in place of the above seal gas, deposition of the silicon out of the deposition area can also be prevented. As the reaction reagent, hydrogen chloride or silicon tetrachloride is used, for example.

Figure 4:
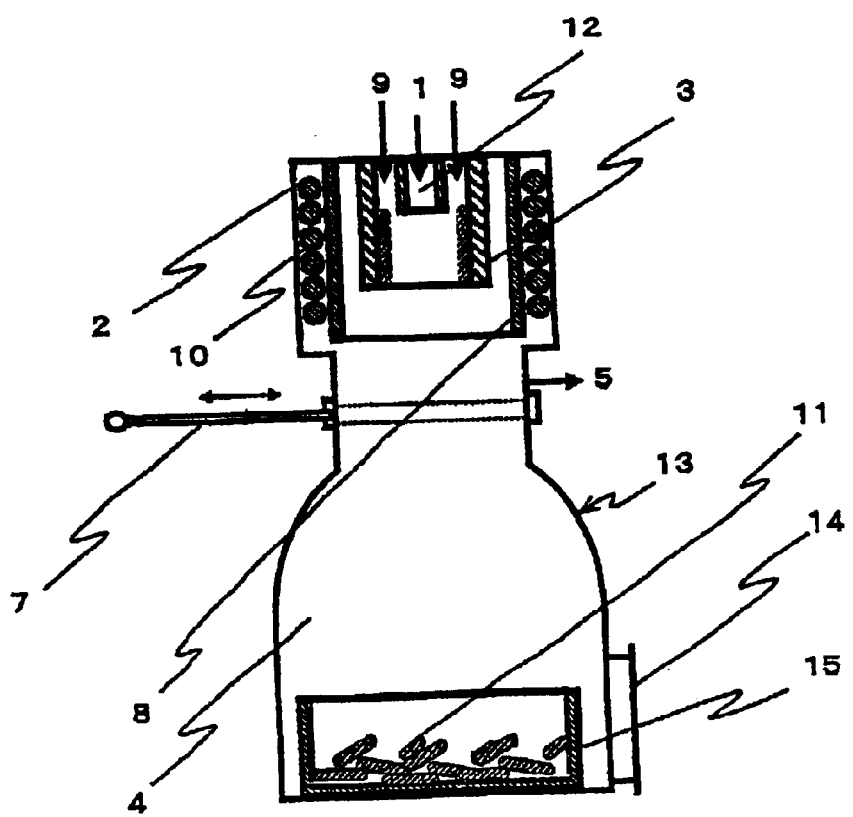
FIG. 4 is a schematic diagram showing another embodiment of the reactor used in the present invention.

Further, when the above cylindrical substrate is used, it is also possible that silicon tetrachloride and hydrogen are fed into space surrounding the external surface of the cylindrical substrate, i.e., space between the substrate 3 and the partition wall 8 as shown in FIGS. 2 and 4, and trichlorosilane is produced by use of heat generated in the space. A portion of the produced trichlorosilane is used in the deposition reaction of silicon on the internal surface of the cylindrical substrate, and the remaining trichlorosilane is recovered from the exhaust gas outlet 5 and can be recycled as a raw material gas after subjected to known purification means.

Furthermore, in the embodiments in which the partition wall 8 which is made of a material which does not block an electromagnetic wave is inserted, the above seal gas is preferably fed into between the casing 13 and the partition wall.

Figure 3:
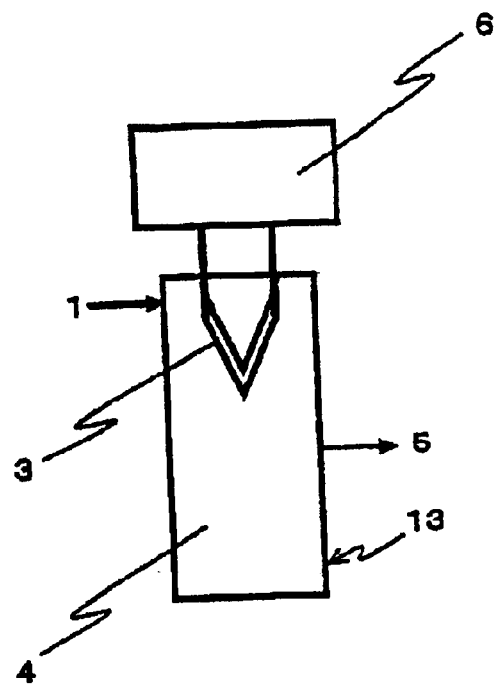
FIG. 3 is a schematic diagram showing another embodiment of the reactor used in the present invention.

FIG. 3 shows a conceptual diagram of a representative reactor using current-based heating means in the present invention. In this case, as in the case of the reactors shown in FIGS. 1 and 2, a raw material gas feed port 1, an exhaust gas outlet 5 and a recovery part 4 are provided.

As shown in FIG. 3, a substrate 3 may be formed of bar-shaped materials connected to each other so as to be energized. Alternatively, it is also acceptable for another embodiment that the substrate is composed of an insulating material, a heating element which generates heat by energization is prepared independently of the substrate, and the substrate is heated by means of the heating element so as to electrically isolate the heating element from silicon to be deposited on the substrate. To be more specific about the latter embodiment, the heating element which generates heat by energization may be placed around the external surface of the above cylindrical insulating substrate so as to deposit silicon on the internal surface of the substrate, or the above heating element may be placed inside of an insulating substrate having space therein so as to deposit silicon on the external surface of the insulating substrate.

In the above embodiments in which the substrate is heated by means of the heating element which generates heat by energization, switching between a temperature for causing silicon to be deposited and a temperature for melting the deposited silicon can be done by adjusting the amount of an electric current. In this case, a current power supply 6 for properly adjusting the temperature of the substrate and the temperature of a deposition surface is used in place of the electromagnetic wave generator 2. As the above current power supply 6, either of an AC power supply and a DC power supply can be suitably used.

In the present invention, a method of taking the silicon 11 out of the recovery part 4 is not particularly limited. FIG. 4 shows a conceptual diagram of a reactor having a structure suitable for carrying out the method of the present invention on an industrial scale. In FIG. 4, as an embodiment for taking the silicon 11 out of the recovery part 4, a structure in which space for the deposition reaction and the recovery part can be separated from each other by means of an atmosphere separator 7 is shown. More specifically, a representative embodiment of the atmosphere separator is an embodiment in which a saucer is slid so as to separate an upper atmosphere from a lower atmosphere.

When the reactor used in the present invention has such a structure with an atmosphere separator as described above, dropped and recovered silicon can be taken out of the reactor with the recovery part 4 in its lower portion opened while the deposition reaction is continued in the silicon depositing space in its upper portion.

As means for taking the silicon out of the reactor, it is preferable to receive dropping silicon 11 in a saucer 15 placed in the recovery part 4 and take the silicon out of the reactor when it is accumulated in a predetermined amount.

Meanwhile, when the space for the deposition reaction is not physically separated from the recovery part, dropped and recovered silicon can be taken out of the reactor after feeding of the deposition raw material gas is stopped once and an inert gas is fed in place of the raw material gas. In this case as well, as long as the substrate to be heated is kept heated, deposition can start immediately once feeding of the deposition raw material gas has started, and a significant reduction in a rate of operation in production of silicon does not occur.

Further, although deposited silicon may be taken out of and recovered from the reactor each time it is dropped from the deposition space, a method in which a relatively large capacity recovery part 4 is provided in the lower portion of the reactor and deposited silicon is taken out of and recovered from the reactor after it is dropped into the recovery part a few times is suitably employed from an economical standpoint.

As shown in the above reactor which can be suitably used in the present invention, when the silicon recovery part 4 is incorporated into the casing 13, a known steel material or carbon material can be used as a material of the casing.

In this case, recovered silicon contaminated by making contact with the above steel material as it drops can still be used as a product without any problems by subjecting the silicon to chemical cleaning so as to etch its surface as required. A more preferable embodiment is an embodiment in which a surface on which silicon flows down is composed of high purity silicon. Thereby, contamination of recovered silicon can be further prevented.

In the present invention, when deposited silicon is recovered in solid form by heating the surface portion at which the deposited silicon makes contact with the substrate, the deposited silicon is obtained as a mass having the surface pattern of the substrate transferred thereon. In the present invention, the recovered silicon can be used as a product as it is or after pulverized in a step subsequent to cooling as required.

Further, when deposited silicon is to be dropped in a molten state and recovered, the molten silicon may be cooled to be solidified by a known solidification method and recovered as powders. Alternatively, the molten silicon may be recovered in a container placed in the recovery part and solidified to be used as a product.

EFFECTS OF THE INVENTION

As can be understood from the above description, according to the present invention, such operations in a batch process required in the conventional Siemens method as replacement of gas inside a bell jar, opening of the bell jar and setting of a new silicon filament can be all left out, so that production costs can be significantly reduced by an improvement in rate of operation and a reduction in operation costs. Further, as compared with a technique of depositing silicon in a molten state, chances of contact between a substrate and molten silicon are significantly limited, so that sufficiently high purity products can be obtained.

Thus, the present invention can produce high purity silicon which is extremely useful in industrial applications more efficiently than conventional methods, and its value is extremely high.

EXAMPLES

Hereinafter, the present invention will be described in detail with reference to Examples. However, the present invention shall not be limited to these Examples.

Example 1

A reactor having the structure shown in FIG. 4 was used. More specifically, as a substrate 3, a graphite cylinder having an internal surface coated with CVD-SiC and having an internal diameter of 50 mm, a length of 30 mm and a thickness of 1 mm was used, and around the cylinder, an electromagnetic wave generating coil having a frequency of 8 kHz was disposed as a heater 2 via a cylindrical partition wall 8 made of SIALON so that an electromagnetic wave can be applied to the graphite cylinder from the coil so as to heat the cylinder.

The graphite cylinder as the substrate 3 was heated by the above heater 2 and maintained in such a state that the temperature of its entire internal surface would be about 1,400° C. Then, a mixed gas comprising hydrogen and trichlorosilane as a raw material gas was fed from a feed port 1 into the substrate 2 via a feed pipe 12 at rates of hydrogen and trichlorosilane of 100 NL/min and 60 g/min, respectively, so as to deposit silicon in solid form on the internal surface of the substrate. Further, an exhaust gas was discharged from an exhaust gas outlet 5, unreacted materials were recovered from the exhaust gas by a known method, purified and then reused as a raw material gas.

In the above operation, a hydrogen gas was fed from a seal gas feed port 9 so as to prevent deposition of silicon in space between the above feed pipe 12 and the substrate 3. Further, between the above cylindrical partition wall 8 and a casing 13 and between the substrate 3 and the cylindrical partition wall 8, a hydrogen gas was fed as a seal gas.

After the above deposition of silicon was carried out continuously for two hours, feeding of trichlorosilane was stopped, and a feed of hydrogen was reduced. Then, when the electromagnetic wave output of the heater 2 was adjusted such that the temperature of the internal surface of the substrate 3 would remain around 1,500° C., only a portion of deposited silicon which was in contact with the internal surface of the graphite cylinder was molten, and the silicon mass whose major portion remained solid was dropped from the cylinder. When the amount of the thus obtained silicon was measured, it was found that the silicon was deposited in a weight of about 370 g per hour.

Thereafter, the above deposition was carried out for 3 hours, the operation of causing deposits to melt and drop was repeated, and the reactor was run for 3 days. When the reactor was opened and the graphite cylinder was examined after the three-day running, no abnormalities were found with respect to the cylinder.

Further, when all recovered deposits were formed into a single crystal and the concentration of carbon was measured by an FT-IR process, it was about 1 ppm.

At the bottom of a recovery part 4, a silicon-containing saucer 15 was placed, and dropped silicon 11 was recovered in the saucer. Further, when a predetermined amount of silicon was accumulated in the saucer 15, the recovery part 4 was separated from reaction space by means of an atmosphere separator 7 at the time of deposition of the silicon, gas in the recovery part 4 was substituted, and a silicon recovery port 14 was then opened so as to take out the above saucer. Then, another saucer was set in the recovery part 4, the silicon recovery port 14 was closed, the atmosphere separator 7 was put back to its original position, and the reactor was operated as normal.

Example 2

Silicon was deposited and molten in the same manner as in Example 1 except that the internal wall of the graphite cylinder as the substrate 3 was coated with pyrocarbon.

As a result, the silicon was deposited in an amount of about 370 g per hour. Further, when all recovered deposits were formed into a single crystal and the concentration of carbon was measured by an FT-IR process, it was about 2 ppm.

Example 3

Silicon was deposited and molten in the same manner as in Example 1 except that a silicon nitride cylinder molded by sintering was inserted into the graphite cylinder as the substrate 3.

As a result, the silicon was deposited in an amount of about 370 g per hour. Further, when all recovered deposits were formed into a single crystal and the concentration of carbon was measured by an FT-IR process, it was not larger than 1 ppm which was a lower detection limit.

Example 4

Silicon was deposited and molten in the same manner as in Example 1 except that the graphite cylinder as the substrate 3 was used as it was.

As a result, the silicon was deposited in an amount of about 370 g per hour. Further, when all recovered deposits were formed into a single crystal and the concentration of carbon was measured by an FT-IR process, it was about 5 ppm.

Example 5

Silicon was deposited and molten in the same manner as in Example 4 except that the temperature of the internal surface of the graphite cylinder was kept at about 1,300° C.

As a result, the silicon was deposited in an amount of 150 g per hour. Further, when all recovered deposits were formed into a single crystal and the concentration of carbon was measured by an FT-IR process, it was about 1 ppm.

Example 6

In the reactor shown in FIG. 4, a graphite bar having a diameter of 25 mm and a length of 300 mm and coated with CVD-SiC was used as a substrate 3. With the substrate 3 suspended from overhead, an electromagnetic wave was applied to the substrate 3 by a heater 2 having a frequency of 300 kHz via a cylindrical quartz wall 8 so as to heat the graphite bar. With the temperature of the surface of the substrate kept at 1,300 to 1,400° C., a mixed gas comprising hydrogen and trichlorosilane was fed into space between the substrate and the cylindrical partition wall 8 via a feed port 1 at rates of hydrogen and trichlorosilane of 100 NL/min and 60 g/min, respectively so as to deposit silicon for 2 hours.

Then, when the temperature of the surface of the substrate 3 was increased by increasing the electromagnetic wave output, the deposited silicon was molten and dropped. When the weight of the dropped deposit was measured after cooled, it was found that the silicon was deposited in a weight of about 180 g per hour. Further, when the recovered deposit was formed into a single crystal and the concentration of carbon was measured by an FT-IR process, it was about 1 ppm.

Thereafter, although silicon was deposited, molten and recovered by repeating the same operation, the reactor could be run continuously for 3 days without any problems.

Example 7

As a reactor, graphite bars each having a diameter of 20 mm and a length of 300 mm were connected to each other so as to form a "V" shape as shown in FIG. 3, suspended in a casing 13 from overhead, and energized by an external AC power supply 6 so as to be heated.

With the temperature of the surface of the graphite bar as a substrate kept at 1,200 to 1,400° C., a mixed gas comprising hydrogen and trichlorosilane was fed into the casing 13 from a feed port 1 at rates of hydrogen and trichlorosilane of 100 NL/min and 60 g/min, respectively.

When the temperature of the surface of the substrate 3 was increased to higher than or equal to the melting point of silicon by increasing the current output after silicon was deposited continuously for 3 hours, the silicon deposits were dropped. The dropped and recovered silicon deposits were in such a state that made it conceivable that most of them were in a molten state while being molten on the substrate. Further, the silicon was deposited in a weight of about 250 g per hour. In addition, when all silicon recovered by the above method was formed into a single crystal and the concentration of carbon was measured by an FT-IR process, it was about 5 ppm.

Thereafter, the above deposition and melting of silicon were repeated, and the reactor was run continuously for 3 days. However, there was nothing wrong with the reactor after the three-day running.

Comparative Example 1

Silicon was produced in the same manner as in Example 1 except that the temperature of the surface of the substrate at the time of deposition of silicon was kept at about 1,500° C. and deposited silicon was caused to drop constantly from the substrate 3.

As a result, it was found that the silicon was deposited in an amount of 230 g per hour. Further, when all recovered silicon was formed into a single crystal and the concentration of carbon was measured by an FT-IR process, it was about 7 ppm.

What is claimed is:

1. A method for producing silicon, which comprises the steps of:

bringing a silane into contact with a surface of a substrate so as to deposit silicon on said surface while the surface of the substrate is heated to and kept at a temperature lower than the melting point of the silicon, and raising the temperature of the surface of the substrate so as to melt a portion or all of the deposited silicon and to drop the melted silicon from the surface of the substrate and to recover it.

2. The method of claim 1, wherein the temperature of the surface of the substrate at the time of deposition of silicon is not lower than 1,350° C. but lower than the melting point of silicon.

* * * * *

UNITED STATES PATENT AND TRADEMARK OFFICE
CERTIFICATE OF CORRECTION

PATENT NO. : 6,784,079 B2
DATED : August 31, 2004
INVENTOR(S) : Wakamatsu et al.

It is certified that error appears in the above-identified patent and that said Letters Patent is hereby corrected as shown below:

Title page,
Item [30], Foreign Application Priority Data, add:
-- Mar. 28, 2002 (JP)..............................2002-091664 --

Signed and Sealed this

Twenty-first Day of December, 2004

JON W. DUDAS
*Director of the United States Patent and Trademark Office*